US012518892B2

(12) United States Patent
Aramaki et al.

(10) Patent No.: US 12,518,892 B2
(45) Date of Patent: Jan. 6, 2026

(54) CONNECTION MODULE OF ELECTRICAL APPARATUS AND WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Miyu Aramaki, Osaka (JP); Yasuo Omori, Osaka (JP); Housei Mizuno, Osaka (JP); Kyousyou Kou, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 114 days.

(21) Appl. No.: 18/566,835

(22) PCT Filed: Jun. 6, 2022

(86) PCT No.: PCT/JP2022/022761
§ 371 (c)(1),
(2) Date: Dec. 4, 2023

(87) PCT Pub. No.: WO2022/270284
PCT Pub. Date: Dec. 29, 2022

(65) Prior Publication Data
US 2024/0274319 A1 Aug. 15, 2024

(30) Foreign Application Priority Data
Jun. 24, 2021 (JP) ................................ 2021-104922

(51) Int. Cl.
*H01B 7/08* (2006.01)
*H01R 12/77* (2011.01)

(52) U.S. Cl.
CPC ......... *H01B 7/0846* (2013.01); *H01R 12/771* (2013.01)

(58) Field of Classification Search
CPC ........................................................ H01B 7/08
(Continued)

(56) References Cited

U.S. PATENT DOCUMENTS 4,635,359 A * 1/1987 Nozick ................ H01B 7/0838 439/492
4,708,664 A 11/1987 Yard
(Continued)

FOREIGN PATENT DOCUMENTS

JP H0846310 * 2/1996
JP 08-153421 * 6/1996
(Continued)

OTHER PUBLICATIONS

International Search Report issued in International Patent Application No. PCT/JP2022/022761, dated Jul. 12, 2022.
(Continued)

*Primary Examiner* — Chau N Nguyen
(74) *Attorney, Agent, or Firm* — Greenblum & Bernstein, P.L.C.

(57) ABSTRACT

A connection module includes: an electrical apparatus; and a wiring member including a connector connected to the electrical apparatus and a plurality of electrical wires extending from the connector in a state of being arranged in a width direction of the connector, wherein the plurality of electrical wires include a narrow width section in which the plurality of electrical wires are located to have a narrower width than a width of the connector in a section away from the connector and a tapered width section in which the plurality of electrical wires are located to have gradually a narrower width toward the narrow width section between the connector and the narrow width section, and the plurality of electrical wires extend from the connector and are folded back so that at least a part of the tapered width section is overlapped with the electrical apparatus.

5 Claims, 9 Drawing Sheets

(58) Field of Classification Search
USPC ....................................................... 174/117 F
See application file for complete search history.

(56) References Cited

U.S. PATENT DOCUMENTS

| | | | | |
|---|---|---|---|---|
| 4,857,012 A | | 8/1989 | Yard | |
| 5,089,669 A | * | 2/1992 | Piper | H01B 7/0823 439/502 |
| 6,444,923 B1 | * | 9/2002 | Iriguchi | H05K 3/361 174/268 |

FOREIGN PATENT DOCUMENTS

| | | |
|---|---|---|
| JP | 2006-173239 | 6/2006 |
| JP | 2009-87686 | 4/2009 |
| JP | 2014-11824 | 1/2014 |
| JP | 2016-157619 | 9/2016 |
| JP | 2019-110749 | 7/2019 |

OTHER PUBLICATIONS

International Preliminary Report on Patentability issued in International Patent Application No. PCT/JP2022/022761, dated Dec. 14, 2023.

Japan Office Action received in JP Application No. 2021-104922, dated Apr. 23, 2024.

* cited by examiner

CONNECTION MODULE OF ELECTRICAL APPARATUS AND WIRING MEMBER

TECHNICAL FIELD

The present disclosure relates to a connection module of an electrical apparatus and a wiring member.

BACKGROUND ART

Patent Document 1 discloses a configuration that a plurality of electrical wires extend from a connector. A plurality of cavities are formed to be arranged in the connector in a width direction of the connector, and the electrical wires extend from each cavity. The plurality of electrical wires are collected to gradually have a narrower width with increasing distance from the connector.

PRIOR ART DOCUMENTS

Patent Document(s)

Patent Document 1: Japanese Patent Application Laid-Open No. 2016-157619

SUMMARY

Problem to be Solved by the Invention

Reduction in an occupied space for the plurality of electrical wires is required near the connector.

An object of the present disclosure is to reduce an occupied space for a plurality of electrical wires near a connector.

Means to Solve the Problem

A connection module of an electrical apparatus and a wiring member according to the present disclosure is a connection module of an electrical apparatus and a wiring member, including: an electrical apparatus; and a wiring member including a connector connected to the electrical apparatus and a plurality of electrical wires extending from the connector in a state of being arranged in a width direction of the connector, wherein the plurality of electrical wires include a narrow width section in which the plurality of electrical wires are located to have a narrower width than a width of the connector in a section away from the connector and a tapered width section in which the plurality of electrical wires are located to have gradually a narrower width toward the narrow width section between the connector and the narrow width section, and the plurality of electrical wires extend from the connector and are folded back so that at least a part of the tapered width section is overlapped with the electrical apparatus.

Effects of the Invention

According to the present disclosure, an occupied space for the plurality of electrical wires can be reduced near the connector.

DESCRIPTION OF EMBODIMENT(S)

Description of Embodiment of Present Disclosure

Figure 1:
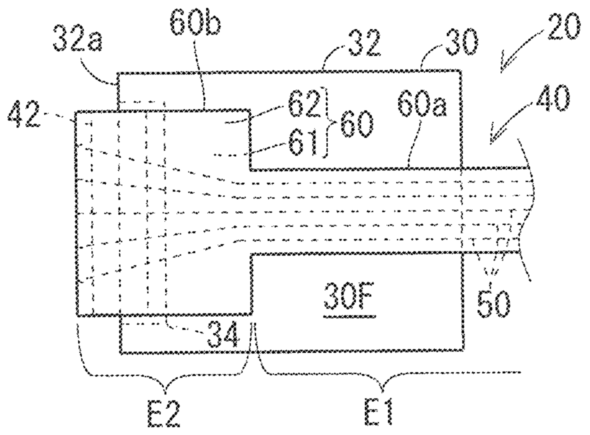
FIG. 1 is a plan view illustrating a connection module of an electrical apparatus and a wiring member according to an embodiment 1.

Embodiments of the present disclosure are listed and described firstly.

A connection module of an electrical apparatus and a wiring member according to the present disclosure is as follows.

(1) A connection module of an electrical apparatus and a wiring member includes: an electrical apparatus; and a wiring member including a connector connected to the electrical apparatus and a plurality of electrical wires extending from the connector in a state of being arranged in a width direction of the connector, wherein the plurality of electrical wires include a narrow width section in which the plurality of electrical wires are located to have a narrower width than a width of the connector in a section away from the connector and a tapered width section in which the plurality of electrical wires are located to have gradually a narrower width toward the narrow width section between the connector and the narrow width section, and the plurality of electrical wires extend from the connector and are folded back so that at least a part of the tapered width section is overlapped with the electrical apparatus.

According to the connection module, the plurality of electrical wires extend from the connector and are folded back so that at least a part of the tapered width section is overlapped with the electrical apparatus, thus an occupied space for the plurality of electrical wires can be reduced.

(2) In the connection module of the electrical apparatus and the wiring member according to (1), the wiring member may include a sheet material holding the plurality of electrical wires in the narrow width section. Accordingly, the wiring member can be kept flat. The plurality of wiring members are expected to be flat also in the tapered width section, and this part can be easily overlapped with the electrical apparatus.

(3) In the connection module of the electrical apparatus and the wiring member according to (2), the plurality of electrical wires may be held on the sheet material in the tapered width section. Accordingly, the plurality of electrical wires are held in a flat state in the tapered width section. Accordingly, the tapered width section can be easily overlapped with the electrical apparatus.

(4) In the connection module of the electrical apparatus and the wiring member according to (2) or (3), the sheet material may cover at least a part of an overlap target surface of the electrical apparatus together with the electrical wires. In this case, the sheet material can protect the electrical apparatus.

(5) In the connection module of the electrical apparatus and the wiring member according to any one of (2) to (4), it is applicable that the sheet material includes an electrical wire holding layer holding the plurality of electrical wires and a protection layer stacked on the electrical wire holding layer on a side opposite to the plurality of electrical wires, and the tapered width section is overlapped with the electrical apparatus while the protection layer is directed outward. Accordingly, the protection layer can effectively protect the electrical wire and the electrical apparatus.

(6) In the connection module of the electrical apparatus and the wiring member according to (5), the protection layer may be an urethan layer. In this case, the urethan layer can increase protection effect.

(7) The connection module of the electrical apparatus and the wiring member according to any one of (2) to (6) may further include a heat transmission member including a first heat transmission part intervening between the electrical apparatus and the wiring member and a second heat transmission part exposed to an outer side from between the electrical apparatus and the wiring member. Accordingly, heat generated in the electrical apparatus is radiated via the second heat transmission part from the first heat transmission part.

(8) In the connection module of the electrical apparatus and the wiring member according to (7), the second heat transmission part may extend to a lateral side from the electrical apparatus. Accordingly, the heat can be effectively radiated in the second heat transmission part extending to the lateral side from the electrical apparatus.

(9) In the connection module of the electrical apparatus and the wiring member according to (7) or (8), it is applicable that the heat transmission member is an electrical apparatus fixing member in which the first heat transmission part is an apparatus holding part holding the electrical apparatus and the second heat transmission part is a fixing part fixed to a fixing target position. Accordingly, the heat can be radiated using the electrical apparatus fixing member.

(10) In the connection module of the electrical apparatus and the wiring member according to (7), the second heat transmission part may be exposed to an opposite side of the wiring member from the electrical apparatus. Accordingly, when the electrical apparatus is disposed on the fixing target position, the second heat transmission part can easily have contact with the fixing target position.

(11) In the connection module of the electrical apparatus and the wiring member according to any one of (7), (8), and (10), the heat transmission member may be a heat transmission layer having higher conductivity than the sheet material and overlapped with the sheet material. Accordingly, the heat transmission member can be assembled to the connection module together with the wiring member.

Detailed Description of Embodiment of Present Disclosure

Specific examples of a connection module of an electrical apparatus and a wiring member are described hereinafter with reference to the drawings. The present disclosure is not limited to these examples, but is indicated by claims, and it is intended that meanings equivalent to claims and all modifications within a scope of claims are included.

EMBODIMENT

Figure 2:
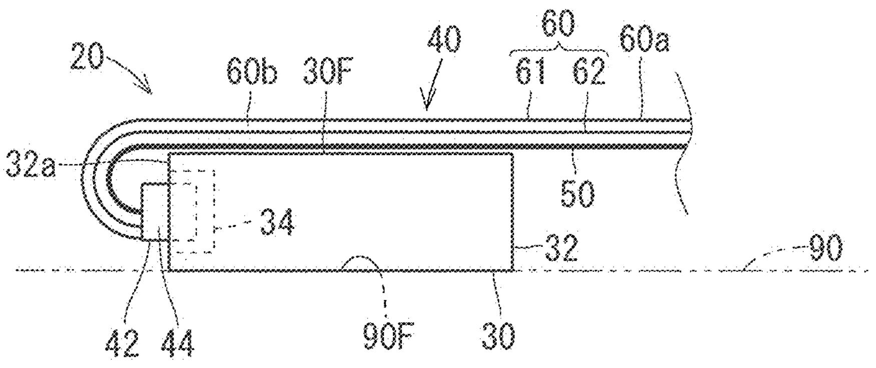
FIG. 2 is a side view illustrating the connection module in FIG. 1.
Figure 3:
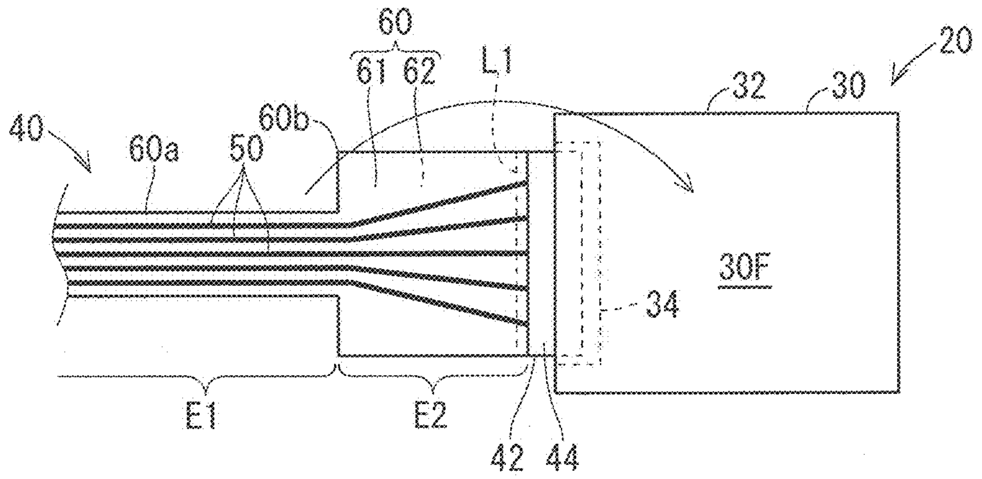
FIG. 3 is a developed view of the connection module in FIG. 1.

A connection module of an electrical apparatus and a wiring member according to an embodiment is described hereinafter. FIG. 1 is a plan view illustrating a connection module 20 of an electrical apparatus and a wiring member according to the embodiment. FIG. 2 is a side view illustrating the connection module 20 described above. FIG. 3 is a developed view of the connection module 20 described above.

The connection module 20 of the electrical apparatus and the wiring member includes an electrical apparatus 30 and a wiring member 40.

The electrical apparatus 30 is an electronic control unit (ECU) controlling various electrical components in a vehicle, for example. The electrical apparatus 30 is not necessarily the ECU, however, an electrical apparatus controlled by the ECU is also applicable, for example.

The electrical apparatus 30 includes a case 32 and an electrical component such as a mounting substrate housed in the case 32, for example. The case 32 has a flat shape such as a flat rectangular parallelepiped shape, for example. In the description hereinafter, a plan view indicates a view which can be observed when the electrical apparatus 30 is seen in a thickness direction.

The electrical apparatus 30 includes an apparatus-side connector 34. The apparatus-side connector 34 faces an outer side of the case 32. Herein, the apparatus-side connector 34 is located on a connector arrangement surface 32*a* which is one of four outer side surfaces of the case 32. The connector arrangement surface 32*a* has a rectangular shape with a short length in a thickness direction of the case 32 and a long length in a direction perpendicular to the thickness direction thereof. The apparatus-side connector 34 is short in the thickness direction of the case 32, and is long in the direction perpendicular to the thickness direction thereof. A connector 42 is connected to the apparatus-side connector 34, thus the electrical component in the electrical apparatus 30 is electrically connected to the other electrical component via the wiring member.

The wiring member 40 includes the connector 42 and a plurality of electrical wires 50.

The connector 42 is a connector which can be connected to the apparatus-side connector 34. The connector 42 has a rectangular parallelepiped shape having a long side in one direction. A longitudinal direction of the connector 42 follows a longitudinal direction of the connector arrangement surface 32*a* described above while the connector 42 is connected to the connector arrangement surface 32*a*. The longitudinal direction of the connector 42 may be grasped as a width direction of the connector 42.

The connector 42 includes a connector housing 44 formed of an insulating material such as resin and a plurality of connector terminals. The plurality of connector terminals are housed at intervals in the connector housing 44 in the longitudinal direction of the connector 42. For example, a plurality of cavities which can house the connector terminals are formed in the connector housing 44. The plurality of cavities are arranged along the longitudinal direction of connector 42. The connector terminal is inserted into each of the plurality of cavities.

The electrical wire 50 includes a core wire and a covering for covering the core wire. The core wire is formed of metal wire material such as copper, copper alloy, aluminum, or aluminum alloy. The core wire may be a single core wire or a stranded wire. The covering is formed of an insulating material such as resin. The covering is formed by extrusion-covering melted resin around the core wire, for example.

The electrical wires 50 may be signal wires or power wires. The plurality of electrical wires 50 may include a complex body of the plurality of electrical wires. Assumed as the complex body of the plurality of electrical wires is a twisted wire or a cable made up of a plurality of collected wire-like objects covered by a sheath, for example.

The connector terminals are connected to the end portions of the plurality of electrical wires 50 by crimping connection, for example. Each connector terminal is inserted and disposed in each cavity of the connector housing 44. The plurality of electrical wires 50 extend outside the connector 42 from a position in the connector housing 44 corresponding to each cavity. The cavities are formed to be arranged in the width direction of the connector 42, thus the plurality of electrical wires 50 extend from the connector 42 to be arranged in the width direction of the connector 42. The plurality of electrical wires 50 may extend from the connector 42 to be arranged in plural rows. In this case, the plural rows in which the plurality of electrical wires 50 are arranged may be rows located in different positions in a short side direction of the connector 42 (herein, the short side direction coincides with the thickness direction of the case 32).

The plurality of electrical wires 50 include a narrow width section E1 and a tapered width section E2. The narrow width section E1 is a section in which the plurality of electrical wires 50 have a narrower width than a width of the connector 42 in a section away from the connector 42. The tapered width section E2 is a section in which the plurality of electrical wires 50 are arranged to gradually have a narrower width toward the narrow width section E1 between the connector 42 and the narrow width section E1.

The arrangement state of the plurality of electrical wires 50 in the narrow width section E1 described above is maintained by an electrical wire holding member. In the present embodiment, the electrical wire holding member is a sheet material 60. The sheet material holds the plurality of electrical wires 50 in the arrangement state described above in the narrow width section E1.

More specifically, the electrical wires 50 are fixed to the sheet material 60. Applicable as the above fixing state are a contact area fixation and a non-contact area fixation, or both fixations may be used together. Herein, the contact area fixation indicates that a portion where the electrical wire 50 and the sheet material 60 have contact with each other is stuck and fixed. The non-contact area fixation indicates the fixing state which is not the contact area fixation. For example, the non-contact area fixation indicates that a sewing thread, the other sheet material, or an adhesive tape presses the electrical wire 50 toward the sheet material 60 or surrounds the electrical wire 50 and the sheet material 60 to sandwich the electrical wire 50 and the sheet material 60, thereby keeping them in a fixing state. In the description hereinafter, the electrical wire 50 and the sheet material 60 are in the state of the contact area fixation. Each description on the contact area fixation is also applicable to the non-contact area fixation as long as each member and material has a configuration to which the non-contact area fixation is not applicable.

Applicable as the configuration of the contact area fixation are a contact area indirect fixation and a contact area direct fixation, or both fixations may also be used together in different regions. Herein, the contact area indirect fixation indicates that the electrical wire 50 and the sheet material 60 are indirectly stuck and fixed via an adhesive agent, a gluing agent, and a double-sided adhesive tape provided therebetween. The contact area direct fixation indicates that the electrical wire 50 and the sheet material 60 are directly stuck and fixed without an intervention of the adhesive agent, for example, which is separately provided. Considered in the contact area direct fixation is that resin included in at least one of the electrical wire 50 and/or the sheet material 60 is melted, thus the electrical wire 50 and the sheet material 60 are stuck and fixed, for example. In the description hereinafter, the electrical wire 50 and the sheet material 60 are in the state of the contact area direct fixation. Each description on the contact area direct fixation is also applicable to the contact area indirect fixation as long as each member and material has a configuration to which the contact area indirect fixation is applicable.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but various means including a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the electrical wire 50 and the sheet material 60 are in the state of the contact area direct fixation by these means. Specifically, when the state of the contact area direct fixation is formed by the ultrasonic welding, for example, the electrical wire 50 and the sheet material 60 are in the state of the contact area direct fixation by the ultrasonic welding. A portion where the state of the contact area direct fixation by the heat is formed by the welding (a fixing portion between the electrical wire 50 and the sheet material 60) may be referred to as a welding part, and herein, the fixing portion by the ultrasonic welding may be referred to as an ultrasonic welding part, and the fixing portion by the heating-pressurizing welding may be referred to as a heating-pressurizing welding part, for example.

In the case of the contact area direct fixation, only the resin included in the covering of the electrical wire 50 may be melted, or only the resin included in the sheet material 60 may be melted. In these cases, the resin which has been melted is stuck on an outer surface of the resin on the other side, and a relatively clear interface may be formed in some cases. In the case of the contact area direct fixation, both the resin included in the covering of the electrical wire 50 and the resin included in the sheet material 60 may be melted. In this case, there may be a case where both the resins are mixed and a clear interface is not formed. Particularly, when the covering of the electrical wire 50 and the sheet material 60 include compatible resin such as the same resin material, for example, there may be a case where both the resins are mixed and a clear interface is not formed.

The sheet material 60 is a flexibly bendable sheet. For example, the sheet material 60 is a bendable sheet flexible enough to be bendable to be overlapped with one main surface of the electrical apparatus 30 in the thickness direction from the connector 42 described above.

The description is based on a premise that the electrical wire 50 described above is fixed to the sheet material 60 by fusion. The sheet material 60 includes an electrical wire holding layer 61. The electrical wire holding layer 61 includes a resin material, or preferably includes a thermoplastic resin material. For example, the resin material of the electrical wire holding layer 61 is softened and fused to the covering of the electrical wire 50. From this viewpoint, the electrical wire holding layer 61 may also be grasped as a fusion layer fused to the electrical wire 50. A type of the resin material is not particularly limited, but polyvinyl chloride (PVC), polyethylene (PE), polypropylene (PP), or polyethylene terephthalate (PET) can be adopted, for example.

A structure of the electrical wire holding layer 61 is not particularly limited. For example, the electrical wire holding layer 61 may be a sheet having a solid cross-sectional surface (also referred to as a non-foam sheet or a solid sheet, for example). The electrical wire holding layer 61 is also considered a foam sheet, for example. The electrical wire holding layer 61 is also considered a fibrous material sheet such as a braided cloth, a woven cloth, or a non-woven cloth, for example.

The sheet material 60 may have a single layer structure. The sheet material 60 may also have a multilayer structure. When the sheet material 60 has the multilayer structure, the electrical wire holding layer 61 preferably appears at least on one main surface of the sheet material 60. Herein, the sheet material 60 includes the electrical wire holding layer 61 and an additional layer 62.

The additional layer 62 is formed of a material different from that of the electrical wire holding layer 61, or has a different structure. The additional layer 62 increases a function of the electrical wire holding layer 61 or adds a function which the electrical wire holding layer 61 does not have to the sheet material 60. A material constituting the additional layer 62 is a material described for the electrical wire holding layer 61 described above or metal, for example. A structure of the additional layer 62 may be any of the structure described for the electrical wire holding layer 61 described above.

The electrical wire holding layer 61 and the additional layer 62 are fixed to each other while a surface of the electrical wire holding layer 61 and a surface of the additional layer 62 have contact with each other. A fixing state of the electrical wire holding layer 61 and the additional layer 62 is not particularly limited, however, fixing by fusion or adhesion is preferable. For example, when at least one of the electrical wire holding layer 61 and/or the additional layer 62 is a sheet having voids in a surface such as a fibrous material sheet or a foam sheet, a resin material or an adhesive agent enters the voids and the layers can be fixed to each other. Such a configuration causes so-called anchor effect, thus the electrical wire holding layer 61 and the additional layer 62 are rigidly fixed.

In the description herein, the electrical wire holding layer 61 is a solid sheet formed of resin and the additional layer 62 is a fibrous material sheet (non-woven cloth, for example). In the description herein, the electrical wire holding layer 61 and the additional layer 62 are fused to each other. That is to say, the resin of the electrical wire holding layer 61 enters between the fibers of the additional layer 62 while having flowability, and is then hardened. Accordingly, a state where the resin of the electrical wire holding layer 61 enters between the fibers of the additional layer 62 is maintained, and the electrical wire holding layer 61 and the additional layer 62 are rigidly fixed. When the additional layer 62 is the fibrous material sheet, the additional layer 62 can add the protection function against contact of an external object to the electrical wire holding layer 61. The fibrous material sheet can provide the sheet material 60 to tensile strength by fibers included in the fibrous material sheet. The additional layer 62 may be made up of an urethan layer formed of an urethan material. In this case, impact can be absorbed by cushioning properties of the urethan layer. Thus, when the additional layer 62 is the urethan layer, the additional layer 62 can add the protection function against contact of an external object to the electrical wire holding layer 61. In this manner, the fibrous material sheet and the urethan layer are examples of the protection layer.

An example that the holding member keeps the plurality of electrical wires 50 in a flat state is described in the present embodiment. The holding member may hold the plurality of electrical wires 50 to have a narrow width in the width direction of the connector 42. Thus, the protection member may be a member bundling the plurality of electrical wires 50 into a circular shape in cross-section. For example, the holding member may be a banding band or an adhesive tape wound around the plurality of electrical wires 50.

The plurality of electrical wires 50 are fixed to the one main surface of the sheet member 60 in a parallel state in the narrow width section E1. The plurality of electrical wires 50 may be arranged at intervals or in a state of having contact with each other. When intervals are provided between the plurality of electrical wires 50, each interval may be an equal interval or unequal interval. A parallel arrangement width of the plurality of electrical wires 50 is smaller than the width of the connector 42 described above in a direction in which the plurality of electrical wires 50 are arranged.

The plurality of electrical wires 50 are fixed to one main surface of sheet material 60 also in the tapered width section E2 in the present embodiment. That is to say, a width of end portions of the plurality of electrical wires 50 connected to the connector 42 is determined in accordance with a width of the plurality of cavities in the connector 42. Thus, an arrangement width of the plurality of electrical wires 50 gradually decreases toward the narrow width section E1 between the connector 42 and the narrow width section E1. It is also considered that the plurality of electrical wires 50 are sharply bended at a position where the electrical wires 50 extend from the connectors 42 so that the intervals thereof are the same as those in the narrow width section E1. However, in this case, parts of the electrical wires 50 extending from the cavities need to be sharply bended. The arrangement width of the plurality of electrical wires 50 gradually decreases toward the narrow width section E1 from the connector 42, thus occurrence of sharp bending positions in the electrical wires 50 can be suppressed.

Herein, a part 60*a* of the sheet material 60 holding the narrow width section E1 of the electrical wires 50 has a band-like shape with a width larger than the parallel arrangement width of the plurality of electrical wires 50 in the narrow width section E1. The plurality of electrical wires 50 are fixed to the band-like part 60*a* in a parallel state along a longitudinal direction of the part 60*a*.

A part 60*b* of the sheet material 60 holding the tapered width section E2 of the electrical wires 50 has a rectangular shape with a width larger than a part thereof holding the narrow width section E1. For example, the part 60*b* is set to have a width substantially equal to the width of the connector 42. It is sufficient that the part 60*b* holding the tapered width section E2 is larger than the width of the plurality of electrical wires 50 in the tapered width section E2, thus needs not have the rectangular shape. For example, the part 60*b* may have a trapezoidal shape gradually having a narrower width toward the part 60*a* described above from the connector 42.

The plurality of electrical wires 50 are not necessarily fixed to the sheet material 60 in the tapered width section E2. The sheet material 60 may hold the plurality of electrical wires 50 in the narrow width section E1 in a position where an end edge of the sheet material 60 is away from the connector 42. Also in this case, the end portions of the plurality of electrical wires 50 are supported by the connector 42 in the parallel state, and the plurality of electrical wires 50 are supported in the parallel state in a position away from the connector 42. Thus, the plurality of electrical wires 50 are kept in a state of being arranged to gradually have the narrower width toward the sheet material 60 from the connector 42 also between the connector 42 and the sheet material 60.

As described above, the section in which the plurality of electrical wires 50 gradually have the narrower width toward the narrow width section E1 between the connector 42 and the narrow width section E1 is the tapered width section E2. The plurality of electrical wires 50 themselves extend to have the larger width in the tapered width section E2 than the plurality of electrical wires 50 in the narrow width section E1. Thus, when the plurality of electrical wires 50 are led out of the electrical apparatus 30 as they are, a wiring space for locating the tapered width section E2 needs to be ensured around the electrical apparatus 30 (refer to FIG. 3).

In the present embodiment, the plurality of electrical wires 50 are folded back at a position L1 where the plurality of electrical wires 50 extend from the connector 42. Herein, the plurality of electrical wires 50 are folded back in the tapered width section E2. Accordingly, at least a part of the tapered width section E2 is overlapped with the electrical apparatus 30. Parts of the plurality of electrical wires 50 in the narrow width section E1 located close to the tapered width section E2 is also overlapped with the electrical apparatus 30 together with the part 60*a*. Parts of the plurality of electrical wires 50 may protrude from the electrical apparatus 30 in the tapered width section E2 in a plan view depending on a shape and a size of the electrical apparatus 30 in a plan view.

The sheet material 60 are also folded back together with the plurality of electrical wires 50 described above, and overlapped with the electrical apparatus 30. In the present embodiment, the part 60*b* corresponding to the tapered width section E2 and a part of the part 60*a* corresponding to the tapered width section E2 close to the part 60*b* are overlapped with the electrical apparatus 30. The whole part 60*b* of the sheet material 60 in the width direction is housed in the electrical apparatus 30 in a plan view in the present embodiment. Accordingly, the sheet material 60 covers at least a part of an overlap target surface 30F of the electrical apparatus 30.

It is optionally set which one of the plurality of electrical wires 50 and the sheet material 60 faces the outer side. The sheet material 60 is preferably overlapped with the electrical apparatus 30 while the plurality of electrical wires 50 face a side of the electrical apparatus 30 from a viewpoint that the sheet material 60 has a role of protecting the plurality of electrical wires 50 and the electrical apparatus 30. Accordingly, direct contact of an object outside the electrical apparatus 30 with the plurality of electrical wires 50 and the electrical apparatus 30 is suppressed, and the plurality of electrical wires 50 and the electrical apparatus 30 are protected.

The sheet material 60 described above may cover any surface in outward surfaces of the electrical apparatus 30. For example, the electrical apparatus 30 is fixed to a fixing surface 90F in a fixing target position 90 such as a body in a vehicle, for example. It is also applicable that a surface of the electrical apparatus 30 on a side opposite to the fixing target position 90 is the overlap target surface 30F, and the sheet material 60 covers the overlap target surface 30F (refer to FIG. 2). The sheet material 60 may cover a surface of the electrical apparatus 30 on a side of the fixing target position 90 as an overlap target surface.

In this case, it is sufficient that the additional layer 62 is directed to an opposite side of the electrical wire holding layer 61 from the electrical wire 50 and an outer side of the electrical apparatus 30. Accordingly, when the additional layer 62 is the protection layer such as the fibrous material sheet or the urethan layer, the protection layer can be disposed on an outer side of the electrical wire holding layer 61, thus the electrical wire holding layer 61, the electrical wire 50, and the electrical apparatus 30 can be effectively protected.

The plurality of electrical wires 50 may be or may not be fixed to the electrical apparatus 30 while the plurality of electrical wires 50 are overlapped with the electrical apparatus 30. Described hereinafter is an example that the plurality of electrical wires 50 are fixed to the electrical apparatus 30 via the sheet material 60.

According to the connection module 20 of the electrical apparatus and the wiring member having such a configuration, the plurality of electrical wires 50 extend from the connector 42 and are folded back, and at least a part of the plurality of electrical wires 50 in the tapered width section E2 is overlapped with the electrical apparatus 30. Thus, the arrangement space for the electrical apparatus 30 and the arrangement space for the tapered width section E2 are overlapped with each other in a plan view. In a plan view, a part of the wiring member 40 extending from the electrical apparatus 30 is mainly a part having a narrow width in the narrow width section E1. Thus, an occupied space for the plurality of electrical wires 50 is reduced.

The plurality of electrical wires 50 are held in a flat state by the sheet material 60 in the tapered width section E2. Thus, the plurality of electrical wires 50 in the tapered width section E2 can be easily and stably overlapped with the electrical apparatus 30.

The sheet material 60 covers at least a part of the overlap target surface 30F of the electrical apparatus 30 together with the electrical wires 50. Thus, the sheet material 60 can protect the electrical apparatus 30.

Particularly, the tapered width section E2 is overlapped with the electrical apparatus 30 while the additional layer 62 as the protection layer is directed outward, thus the additional layer 62 as the protection layer can effectively protect the electrical wire holding layer 61, the electrical wire 50, and the electrical apparatus 30.

Various modification examples are described based on a premise of the embodiment described above.

Figure 4:
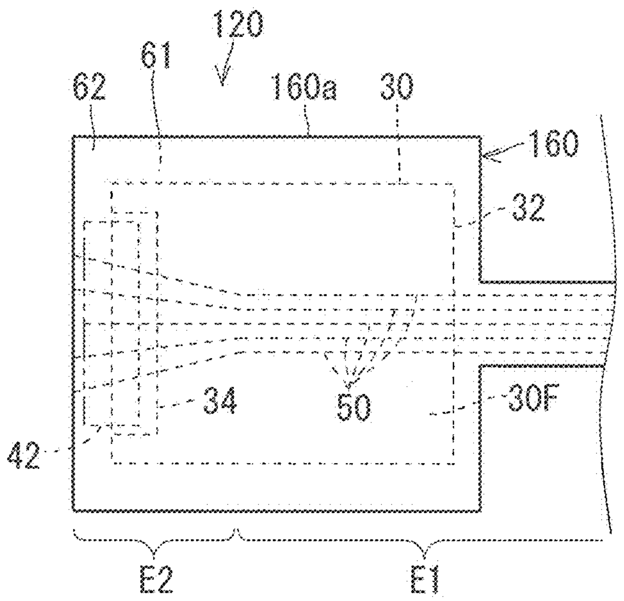
FIG. 4 is a plan view illustrating a connection module of an electrical apparatus and a wiring member according to a first modification example.

FIG. 4 is a plan view illustrating a connection module 120 of an electrical apparatus and a wiring member according to a first modification example.

In the first modification example, the following sheet material 160 is used in place of the sheet material 60. A part 160*a* of the sheet material 160 overlapped with the electrical apparatus 30 extends over a region equal to or larger than the electrical apparatus 30 in a plane area. In the present embodiment, the part 160*a* of the tapered width section E2 and the narrow width section E1 in the sheet material 160 corresponding to a part close to the tapered width section E2 is formed into a rectangular shape larger than the electrical apparatus 30 in a plan area. Thus, when the sheet material 160 is folded back together with the plurality of electrical wires 50, the part 160*a* covers the electrical apparatus 30 while four sides of the part 160*a* protrudes from the electrical apparatus 30.

A sheet material including the electrical wire holding layer 61 and the additional layer 62 may be used as the sheet material 160 in the manner similar to the sheet material 60 described above. In this case, the additional layer 62 is preferably the protection layer and disposed on the outer side of the electrical wire holding layer 61.

It is also applicable that the sheet material 160 is overlapped with the electrical apparatus 30, and is kept on the electrical apparatus 30 by a self-weight. The sheet material 160 may be fixed to the electrical apparatus 30. An example of fixing the sheet material 160 to the electrical apparatus is described in a second modification example and a third modification example.

According to the present modification example, the sheet material 160 extends to be larger than the electrical apparatus 30 to cover the electrical apparatus 30 in a plan view. Thus, the electrical apparatus 30 is not exposed, but the sheet material 160 can effectively protect the electrical apparatus 30 in a plan view.

When at least one layer of the sheet material 160 has a solid cross-section, water streams down the sheet material 160 to be guided to the outer side of the electrical apparatus 30 even if the water drops on the sheet material 160. Thus, waterproof properties can also be improved in the electrical apparatus 30.

Figure 5:
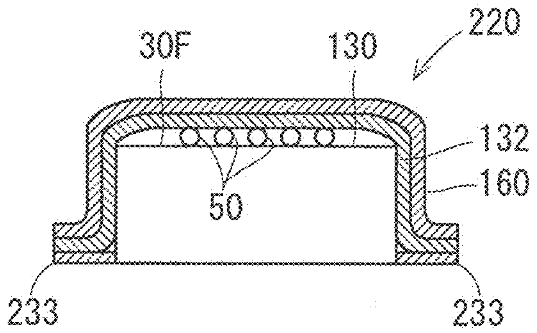
FIG. 5 is an explanation view illustrating a connection module of an electrical apparatus and a wiring member according to a second modification example.

FIG. 5 is an explanation view illustrating a connection module 220 of an electrical apparatus and a wiring member according to the second modification example. In FIG. 5, the sheet material 160 and a fixing piece 233 are illustrated in cross-section, and outlines are illustrated in an electrical apparatus 130 and the electrical wire 50.

Described in the second modification example is a configuration example for fixing the sheet material 160 to the electrical apparatus 130 based on a premise of the sheet material 160 according to the first modification example.

That is to say, the pair of fixing pieces 233 are formed on an outer side surface of the electrical apparatus 130 corresponding to the electrical apparatus 30. The pair of fixing pieces 233 are formed to protrude on two side surfaces parallel to each other in a case 132 corresponding to the case 32. The pair of fixing pieces 233 are formed on two side surfaces perpendicular to the connector arrangement surface 32*a* adjacent to the connector arrangement surface 32*a*. The pair of fixing pieces 233 extend in parallel to the overlap target surface 30F.

The plurality of electrical wires 50 are disposed between the sheet material 160 and the overlap target surface 30F on the overlap target surface 30F. Both side parts of the sheet material 160 protrude from the overlap target surface 30F to be disposed along the two side surfaces described above. Edge portions of both side parts of the sheet material 160 are overlapped with the pair of fixing pieces 233. Two edge portions of the sheet material 160 are fixed to the corresponding fixing pieces 233, respectively. The end portion of the sheet material 160 and the fixing piece 233 may be fixed by fusion by ultrasonic waves or heating, for example. The end portion of the sheet material 160 and the fixing piece 233 may be fixed by a gluing agent, an adhesive agent, a locking structure, or screwing, for example.

According to the present second modification example, the sheet material 160 can be fixed to the electrical apparatus 130 to be kept in a constant position.

Figure 6:
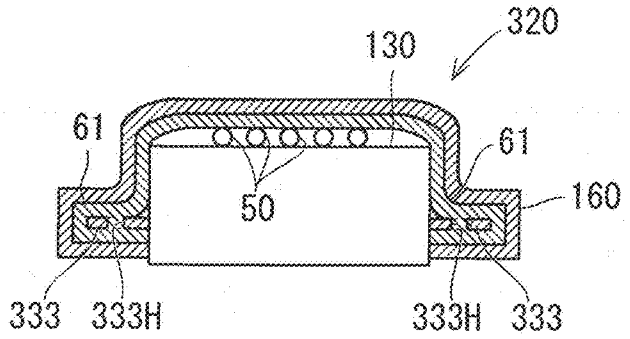
FIG. 6 is an explanation view illustrating a connection module of an electrical apparatus and a wiring member according to a third modification example.
Figure 7:
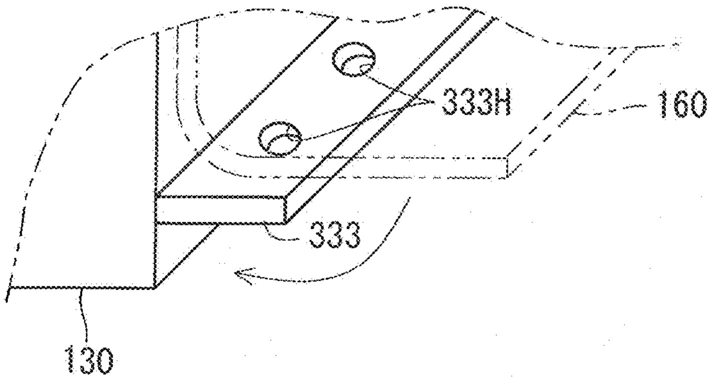
FIG. 7 is an explanation view illustrating a fixing piece of the connection module in FIG. 1.

FIG. 6 is an explanation view illustrating a connection module 320 of an electrical apparatus and a wiring member according to the third modification example. In FIG. 6, the sheet material 160 and a fixing piece 333 corresponding to the fixing piece 233 described above are illustrated in cross-section, and outlines are illustrated in the electrical apparatus 130 and the electrical wire 50. FIG. 7 is an explanation view illustrating the fixing piece 333 of the connection module 320 described above.

The third modification example is different from the second modification example in a configuration of the fixing piece 333 corresponding to the fixing piece 233 and a configuration of fixing the sheet material 160 to the fixing piece 333.

In the third modification example, a through hole 333H is formed in the fixing piece 333. A side edge portion of the sheet material 160 sandwiches the fixing piece 333 from both surface sides. In this state, the side edge portion of the sheet material 160, particularly a part thereof disposed in a position corresponding to the through hole 333H is heated. Then, a part of the electrical wire holding layer 61 of the sheet material 160 approaching both openings of the through hole 333H is melted and flows in the through hole 333H. Accordingly, the electrical wire holding layer 61 is connected through the through hole 333H, and the side edge portion of the sheet material 160 keeps sandwiching the fixing piece 333. Accordingly, two edge portions of the sheet material 160 are fixed to the corresponding two fixing pieces 333, respectively.

According to the third modification example, the side edge portion of the sheet material 160 is fixed to the fixing piece 333 while the electrical wire holding layer 61 is connected through the through hole 333H, thus the sheet material 160 can be easily and firmly fixed to the electrical apparatus 130.

Figure 8:
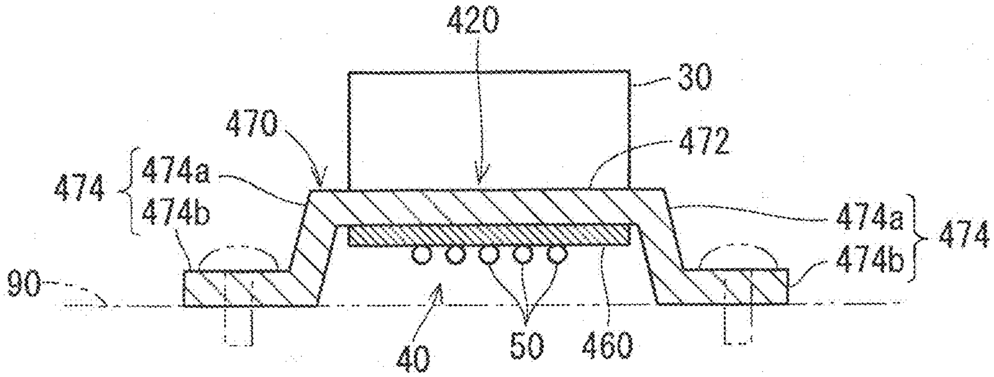
FIG. 8 is an explanation view illustrating a connection module of an electrical apparatus and a wiring member according to a fourth modification example.

FIG. 8 is an explanation view illustrating a connection module 420 of an electrical apparatus and a wiring member according to a fourth modification example. In FIG. 8, a sheet material 460 and a heat transmission member 470 are illustrated in cross-section, and outlines are illustrated in the electrical apparatus 30 and the electrical wire 50. The sheet material 460 may be a single layer or may be a plurality of stacked layers.

The connection module 420 according the fourth modification example includes the heat transmission member 470. The heat transmission member 470 includes a first heat transmission part 472 and a second heat transmission part 474.

The first heat transmission part 472 is part intervening between the electrical apparatus 30 and the wiring member 40. The first heat transmission part 472 is fixed to the electrical apparatus 30 by screwing, an adhesive agent, or a gluing agent, for example. The first heat transmission part 472 preferably has contact with at least a part of the surface of the electrical apparatus 30. The contact herein includes a case where the first heat transmission part 472 has direct contact with the surface of the electrical apparatus 30 and a case where the first heat transmission part 472 has contact therewith via a heat conductive member. The heat conductive member is a heat conductive grease, a heat conductive adhesive agent, or a heat conductive sheet, for example. Described in the present example is the example that the first heat transmission part 472 and the wiring member 40 are disposed on the surface of the electrical apparatus 30 on the side of the fixing target position 90, however, the first heat transmission part 472 and the wiring member 40 may be disposed on the other surface of the electrical apparatus 30 such as the surface on the side opposite to the fixing target position 90, for example.

The second heat transmission part 474 is a part connected to the first heat transmission part 472, and is exposed to the outer side from between the electrical apparatus 30 and the wiring member 40 described above. In the present embodiment, the second heat transmission part 474 extends to a lateral side from the electrical apparatus 30 in a plan view.

It is sufficient that the heat transmission member 470 described above has higher conductivity than the sheet material 460. The heat transmission member 470 may be formed by metal such as iron or aluminum, for example. The heat transmission member 470 may be formed by resin including a heat conductive filler. The heat conductive filler is metal such as copper or ceramics such as graphite, for example.

The heat transmission member 470 may be a member having rigidity large enough to be able to maintain a constant shape or a member having flexibility large enough to be bendable with the sheet material 460. In the present modification example, the heat transmission member 470 is a member having rigidity large enough to be able to maintain a constant shape. For example, the heat transmission member 470 is formed by performing press working on a metal plate.

In this case, the heat transmission member 470 can have a function as an electrical apparatus fixing member (bracket, for example) for fixing the electrical apparatus 30 to the fixing target position 90. In the present modification example, the first heat transmission part 472 is an apparatus holding part holding the electrical apparatus 30. For example, the first heat transmission part 472 and the electrical apparatus 30 are fixed by an adhesive agent, a gluing agent, screwing, or a fitting structure. The wiring member 40 is fixed to the surface of the first heat transmission part 472 on a side opposite to the electrical apparatus 30. The wiring member 40 is fixed to the first heat transmission part 472 by an adhesive agent or a gluing agent, for example.

Two second heat transmission parts 474 are provided to both side parts of the first heat transmission part 472. The second heat transmission part 474 includes a leg part 474*a* directed to a direction away from the electrical apparatus 30 and a leg tip end portion 474*b* extending from a tip end portion of the leg part 474*a*. In the present embodiment, two leg parts 474*a* are inclined so that a distance therebetween is increased with increasing distance from the electrical apparatus 30. The electrical apparatus 30 is held in a position away from the fixing target position 90 by two leg parts 47*a*, and a space where the wiring member 40 can be disposed is ensured between the electrical apparatus 30 and the fixing target position 90.

Two leg tip end portions 474*b* extend in directions away from each other. Two leg parts 47*a* are fixed to the fixing target position by screwing while two leg tip end portions 474*b* have contact with the fixing target position 90. That is to say, the second heat transmission part 474 is a fixing part fixed to the fixing target position 90.

According to the present example, heat generated in the electrical apparatus 30 is radiated via the second heat transmission part 474 from the first heat transmission part 472.

Particularly, the second heat transmission part 474 extends to the lateral side from the electrical apparatus 30, thus the heat is effectively radiated in the second heat transmission part 474.

The second heat transmission part 474 is fixed to the fixing target position 90, thus the heat transmitted from the electrical apparatus 30 to the heat transmission member 470 is efficiently transmitted to the fixing target position 90, and the heat is radiated. Thus, the heat of the electrical apparatus 30 can be effectively radiated using a member fixing the electrical apparatus 30.

Figure 9:
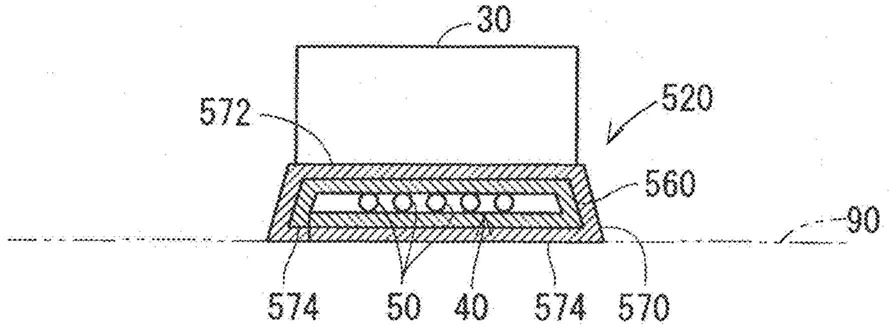
FIG. 9 is an explanation view illustrating a connection module of an electrical apparatus and a wiring member according to a fifth modification example.

FIG. 9 is an explanation view illustrating a connection module 520 of an electrical apparatus and a wiring member according to a fifth modification example. In FIG. 9, a sheet material 560 and a heat transmission member 570 are illustrated in cross-section, and outlines are illustrated in the electrical apparatus 30 and the electrical wire 50.

The connection module 520 according the fifth modification example includes the heat transmission member 570. The heat transmission member 570 includes a first heat transmission part 572 corresponding to the first heat transmission part 472 described above and the second heat transmission part 574 corresponding to the second heat transmission part 474.

A point in which the heat transmission member 570 is different from the heat transmission member 470 is mainly described.

The heat transmission member 570 is a member having flexibility large enough to be bendable with the sheet material 560. For example, the heat transmission member 570 is formed by resin including a heat conductive filler or a metal foil.

The heat transmission member 570 is overlapped with the sheet material 560 described above, and constitutes a heat transmission layer bended with the sheet material 560. The heat transmission member 570 may wholly or partially extend on the sheet material 560. Herein described is an example that the heat transmission member 570 wholly extends on the sheet material 560. The heat transmission member 570 and the sheet material 560 may be fixed by fusion in the manner similar to the configuration that the sheet material 60 in the embodiment has a multilayer structure.

A part of the heat transmission member 570 is fixed to the electrical apparatus 30 as the first heat transmission part 572. In the present embodiment, a center part of the heat transmission member 570 in a width direction is fixed to the electrical apparatus 30 as the first heat transmission part 572. The heat transmission member 570 can be fixed to the electrical apparatus 30 by an adhesive agent or a gluing agent, for example. The sheet material 560 is fixed to the heat transmission member 570, and the plurality of electrical wires 50 are fixed to the sheet material 560, thus the plurality of electrical wires 50 are also fixed to the electrical apparatus 30.

The second heat transmission part 574 of the heat transmission member 570 is bended in relation to the first heat transmission part 572, and the second heat transmission part 574 is disposed to be exposed to the opposite side of the wiring member 40 from the electrical apparatus 30. Herein, two second heat transmission parts 574 extend to both lateral sides of the first heat transmission part 572. When two second heat transmission parts 574 are folded back to be overlapped with the first heat transmission part 572, the second heat transmission part 574 is exposed to the outer side of the electrical apparatus 30. In this state, the second heat transmission part 574 may be fixed to the electrical wire 50 by an adhesive agent or a gluing agent, for example. The plurality of electrical wires 50 are disposed in a space between the first heat transmission part 572 and the second heat transmission part 574. Two second heat transmission parts 574 may be or may not be overlapped with each other. In FIG. 9, end edges of two second heat transmission parts 574 abut each other.

The electrical apparatus 30 is disposed in the fixing target position 90 while the second heat transmission part 574 is disposed on the fixing target position 90. The second heat transmission part 574 can easily have contact with the fixing target position 90 in this state. The contact herein includes not only direct contact but also contact via a heat conductive member. It is applicable that the second heat transmission part 574 is fixed to the fixing target position 90 via an adhesive agent, for example, or the electrical apparatus 30 is fixed to the fixing target position via a bracket. In the present modification example, the second heat transmission part 574 is not necessarily exposed to an opposite side of the electrical wire from the electrical apparatus. The second heat transmission part 574 may be led to the outer side of the electrical apparatus.

Also according to the present fifth modification example, heat generated in the electrical apparatus 30 is radiated via the second heat transmission part 574 from the first heat transmission part 572.

The second heat transmission part 574 is exposed to the opposite side of the electrical wire 50 from the electrical apparatus 30. Thus, the second heat transmission part 574 can easily have contact with the fixing target position 90 while the second heat transmission part 574 is disposed on the fixing target position 90, and heat can be radiated using the second heat transmission part 574.

The heat transmission member 570 can be easily assembled to the electrical apparatus 30 together with the wiring member 40 in a layer in which the heat transmission member 570 is overlapped with the sheet material 560.

Each configuration described in the embodiments and modification examples thereof can be appropriately combined as long as they are not contradictory.

EXPLANATION OF REFERENCE SIGNS

20, 120, 220, 320, 420, 520 connection module of electrical apparatus and wiring member
30, 130 electrical apparatus
30F overlap target surface
32, 132 case
32*a* connector arrangement surface
34 apparatus-side connector
40 wiring member
42 connector
44 connector housing
50 electrical wire
60, 160, 460, 560 sheet material
60*a* part of sheet material holding narrow width section in electrical wire
60*b* part of sheet material holding tapered width section in electrical wire
61 electrical wire holding layer
62 additional layer
90 fixing target position
90F fixing surface
160*a* part of sheet material overlapped with electrical apparatus
233, 333 fixing piece
333H through hole
470 heat transmission member (electrical apparatus fixing member)
472 first heat transmission part (apparatus holding part)
474 second heat transmission part (fixing part)
474*a* leg part
474*b* leg tip end portion
570 heat transmission member
572 first heat transmission part
574 second heat transmission part
E1 narrow width section
E2 tapered width section

The invention claimed is:

1. A connection module of an electrical apparatus and a wiring member, comprising:
- an electrical apparatus;
- a wiring member including a connector connected to the electrical apparatus and a plurality of electrical wires extending from the connector in a state of being arranged in a width direction of the connector, wherein
- the plurality of electrical wires include a narrow width section in which the plurality of electrical wires are located to have a narrower width than a width of the connector, the narrow width section defines a section that is away from the connector and a tapered width section in which the plurality of electrical wires are located, the tapered width section has a width that gradually narrows in a direction towards the narrow width section, and the tapered width section being located between the connector and the narrow width section in an extending direction of the plurality of electrical wires,
- the plurality of electrical wires extend from the connector and are folded back so that at least a part of the tapered width section is overlapped with the electrical apparatus, and
- wherein the wiring member includes a sheet material holding the plurality of electrical wires in the narrow width section; and
- a heat transmission member including a first heat transmission part intervening between the electrical apparatus and the wiring member and a second heat transmission part exposed to an outer side from between the electrical apparatus and the wiring member.

2. The connection module of the electrical apparatus and the wiring member according to claim 1, wherein
- the second heat transmission part extends to a lateral side from the electrical apparatus.

3. The connection module of the electrical apparatus and the wiring member according to claim 1, wherein
- the heat transmission member is an electrical apparatus fixing member in which the first heat transmission part is an apparatus holding part holding the electrical apparatus and the second heat transmission part is a fixing part fixed to a fixing target position.

4. The connection module of the electrical apparatus and the wiring member according to claim 1, wherein
- the second heat transmission part is exposed to an opposite side of the wiring member from the electrical apparatus.

5. The connection module of the electrical apparatus and the wiring member according to claim 1, wherein
the heat transmission member is a heat transmission layer having higher conductivity than the sheet material and overlapped with the sheet material.

* * * * *